United States Patent Office 3,681,294
Patented Aug. 1, 1972

3,681,294
POLYMERIZATION OF 2-PYRROLIDONE IN THE PRESENCE OF SO₂ WITH MIXTURE OF AN ALKALI METAL SULFITE AND AN ALKALI METAL BISULFITE
Peter A. Jarovitzky, Stamford, Conn., assignor to Radiation Research Corporation, Stamford, Conn.
No Drawing. Filed Sept. 3, 1970, Ser. No. 69,432
Int. Cl. C08g 20/16
U.S. Cl. 260—78 P    7 Claims

ABSTRACT OF THE DISCLOSURE

In the polymerization of 2-pyrrolidone in the presence of an alkaline polymerization catalyst and sulfur dioxide as a polymerization activator, the improvement which comprises effecting the polymerization in the presence of a mixture of an alkali metal sulfite and an alkali metal bisulfite which has been added to the reaction mass before the polymerization, the sulfur dioxide being not more than 0.90 mol per mol of alkaline polymerization catalyst.

---

This invention relates to the polymerization of 2-pyrrolidone.

The polymer formed from 2-pyrrolidone is believed to be a linear polyamide, which has come to be known as nylon-4, having the structure:

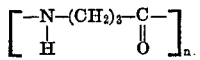

The polymer may be shaped into ribbons, films, molded articles and fibers. Because of its hydrophilic properties, which closely resemble those of cotton and silk, nylon-4 fiber has long been recognized as having great commercial potential. For example, fabrics made from nylon-4, in contrast with other presently available synthetic fibers, are as readily dyed as cotton; they may be ironed at cotton temperatures; they rapidly dissipate static charges; and, in particular, they possess the comfort of cotton and wool.

Methods for the polymerization of 2-pyrrolidone to form polypyrrolidone have been previously disclosed, for example, in U.S. Pats. 2,638,463, 2,809,958 and 2,891,038. In general, these methods involve the polymerization of 2-pyrrolidone in the presence of an alkaline polymerization catalyst, and, usually, with an activator as well. In general, 2-pyrrolidone monomer may be polymerized at a temperature from about 18° C. to about 100° C., preferably 25° C. to 70° C., and most preferably 25° C. to 60° C., under a pressure ranging from subatmospheric to superatmospheric in the presence of the alkaline polymerization catalyst. Bulk polymerization or suspension polymerization can be used. A technique using an anhydrous non-solvent, such as hydrocarbon, is suitable, as described in U.S. Pat. 2,739,959.

The catalyst may be any alkaline catalyst for polymerizing 2-pyrrolidone, such as those disclosed in previously mentioned U.S. Pat. 2,638,463, and suitable catalysts are derivatives of the alkali metals, e.g. the hydrides, hydroxides and oxides of the alkali metals. The alcoholates of the alkali metals, such as sodium methylate, may also be used with good results.

In addition, the oxides and hydroxides of the alkaline earth metals, for example, calcium and barium, may be used as catalysts. Also, organic metallic compounds, preferably those which are strongly basic, may be used, such as the lithium, potassium and sodium alkyls, e.g. butyl lithium, and the aryls of the alkali metals, such as sodium phenyl and sodium amide. The catalyst may be a quaternary ammonium base as described in U.S. Pat. 2,973,343 of the formula:

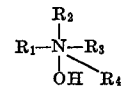

wherein $R_1$, $R_2$ and $R_3$ are lower alkyl radicals and $R_4$ is an alkyl, aryl or aralkyl radical. Further, as previously mentioned, the catalyst may be an alkali metal hydride, such as sodium hydride, as described in U.S. Pat. 3,075,-953.

The catalyst may be used in an amount of 0.5 to 50% by weight, based on the 2-pyrrolidone monomer, preferably 5 to 30 wt. percent, most preferably 8 to 20 wt. percent.

U.S. Pat. 3,174,951 discloses the use of Group VI oxides in general, and SO₂ in particular, as activators (chain initiators) to be used in the polymerization of 2-pyrrolidone together with the alkaline polymerization catalyst. It is stated therein that from 1 to 10 mol percent of the alkaline polymerization catalyst and from 1 to 10 mol percent of the Group VI oxide, based on the 2-pyrrolidone, are to be used.

It has been found that the method of U.S. Pat. 3,174,-951, when SO₂ is used as the activator, can be greatly improved if the addition of SO₂ to the mixture of 2-pyrrolidone and alkaline polymerization catalyst is effected in the presence of an added mixture of an alkali metal sulfite and an alkali metal bisulfite. The term "added mixture" is intended to mean a mixture added to the system rather than a mixture formed in situ. Addition of the mixture of sulfite and bisulfite tends to increase the initial rate of conversion of 2-pyrrolidone to the polypyrrolidone and/or to increase the molecular weight of the polymer.

It has further been found that the polypyrrolidone formed through the use SO₂ has a distinct yellow coloration when amounts of SO₂ are used in excess of about 4-4.5 mol percent based on the 2-pyrrolidone. Through the use of the added mixture of sulfite and bisulfite and carefully controlled amounts of SO₂, the present invention now provides an improved method of polymerizing 2-pyrrolidone at high rates of conversion to a higher molecular weight, white polymer.

Accordingly, the present invention provides a method of polymerizing 2-pyrrolidone in the presence of an alkaline polymerization catalyst, an added mixture of an alkali metal sulfite and an alkali metal bisulfite and SO₂.

The amount of SO₂ must be limited to not more than 0.90 mol per mol of alkaline polymerization catalyst, since above this amount a yellow-colored polymer is obtained. Indeed, the larger the molar ratio of SO₂ to alkaline polymerization catalyst above 0.90, the darker the color becomes, proceeding from light yellow to dark brown, and concurrently, the polymerization rate approaches zero. A preferred amount of SO₂ is in the range of 0.20 to 0.85 mol SO₂ per mol of alkaline polymerization catalyst, with optimum results obtained in the range of 0.45 to 0.75.

A preferred alkaline polymerization catalyst is the alkali metal salt of 2-pyrrolidone, which is desirably formed by reacting under vacuum an alkali metal hydroxide with an excess of 2-pyrrolidone to provide a mixture of 2-pyrrolidone and salt thereof, the water thus formed being removed, if desired.

The added mixture must actually be a mixture of sulfite and bisulfite, since the use of alkali metal sulfite alone or alkali metal bisulfite alone is not suitable. Also K₂S₂O₅ is also not suitable.

The amount of the added mixture is desirably up to about 15 percent by weight, preferably about 1 to 5 percent by weight, based on the monomer. Amounts of the added mixture of sulfite and bisulfite in excess of about 5% give only slightly better effects than amounts of 5% or less, and amounts in excess of 15% will thicken the reaction mass and could make the handling more difficult. The ratio of sulfite to bisulfite is not critical, and good results are obtained at a weight ratio of sulfite to bisulfite of from 5:1 to 1:6, preferably 1:2.5 to 1:3.0.

Polymerizations at 50° C. are preferred over those at room temperature, and there does not appear to be any advantage in going to polymerization temperatures in excess of 50° C.

EXAMPLES 1–8

A round bottom flask equipped for vacuum distillation was charged with 240 grams 2-pyrrolidone, 7.4 grams KOH pellets (85% assay) and either a mixture of NaHSO$_3$ and Na$_2$SO$_3$ or NaHSO$_3$, Na$_2$SO$_3$ or K$_2$S$_2$O$_5$ alone. Control runs were made in Examples 1–4 using no added mixture. The flask was evacuated to maximum pump capacity (about 3 mm. Hg) under nitrogen and the mixture was heated to incipient distillation for about 20 minutes at 104° C., and 40 grams were distilled over. The flask was then cooled to 30° C. and the desired amount of SO$_2$ was admitted to the flask, while under vacuum, from an SO$_2$ generator. Nitrogen was then introduced into the flask to bring the pressure to atmospheric, and the reaction mass was transferred to a polymerization oven maintained at 50° C. or allowed to polymerize at room temperature.

The SO$_2$ generator was a round bottom flask containing NaHSO$_3$ into which was added, through an addition funnel, measured amounts of a stock solution of aqueous HCl made from 2.7 parts by volume of concentrated HCl and 5.3 parts by volume of distilled water. SO$_2$ thus generated was passed through a drying column of Drierite before being introduced into the mixture to be polymerized.

Table I below lists the results of Examples 1–8.

polymers of Examples 1b and 3b is due to insufficient washing.

What is claimed is:

1. In the polymerization of 2-pyrrolidone in the presence of an alkaline polymerization catalyst and sulfur dioxide as a polymerization activator to form a solid polymer, the improvement which comprises effecting the polymerization in the presence of at least about 1% by weight, based on the weight of the 2-pyrrolidone, of a mixture of an alkali metal sulfite and an alkali metal bisulfite which has been added to the reaction mass before the polymerization, the sulfur dioxide being not more than 0.90 mol per mol of alkaline polymerization catalyst.

2. The process according to claim 1, wherein the amount of SO$_2$ is from 0.20 to 0.85 mol of SO$_2$ per mol of alkaline polymerization catalyst.

3. The process according to claim 1, wherein the amount of the mixture of alkali metal sulfite and alkali metal bisulfite is up to about 15% by weight, based on the weight of the 2-pyrrolidone.

4. The process acording to claim 3, wherein the amount of said added mixture of bisulfite and sulfite is from about 1% to about 5% by weight, based on the weight of the 2-pyrrolidone.

5. The process according to claim 1, wherein the weight ratio of alkali metal sulfite to alkali metal bisulfite is from 5:1 to 1:6.

6. The process according to claim 1, wherein the alkali metal of said bisulfite and said sulfite is sodium or potassium.

7. The process according to claim 1, wherein 2-pyrrolidone is heated under vacuum with an alkali metal hydroxide in an amount less than the stoichiometric amount necesary to convert all of said 2-pyrrolidone to the alkali metal salt thereof, said 2-pyrrolidone and said alkali metal hydroxide being heated in the presence of a mixture of sodium bisulfite and sodium sulfite, sulfur

TABLE I

| Example | Reaction mass | | | Polymerization | | | Polymer | | Conversion (percent) | Intrinsic[1] viscosity |
| | NaHSO$_3$ (g.) | Na$_2$SO$_3$ (g.) | SO$_2$ (mols) | Temp. (° C.) | Time (hrs.) | Appearance | Color | | | |
| | | | | | | | Wet | Dry | | |
|---|---|---|---|---|---|---|---|---|---|---|
| 1a | | | 0.041 | (2) | 90 | Slush-soft | Light yellow | White | 9.7 | 4.7 |
| | | | | 50 | 24 | Soft-solid | Dark yellow | do | 13.5 | 4.0 |
| 1b | 3.3 | 0.9 | 0.041 | (2) | 86 | Solid | Light yellow | Light yellow | 28.7 | 5.7 |
| | | | | 50 | 15 | Hard-solid | Yellow | do | 25.7 | 7.5 |
| 2a | | | 0.033 | (2) | 96 | Soft-solid | Light yellow | White | 11.9 | 5.3 |
| | | | | 50 | 24 | do | Orange yellow | do | 16.0 | 4.0 |
| 2b | 3.3 | 0.9 | 0.033 | (2) | 87 | Very hard | White | White | 31.4 | 9.3 |
| | | | | 50 | 15 | Hard-solid | Light yellow | do | 22.9 | 9.7 |
| 3a | | | 0.025 | (2) | 93 | Soft-solid | Slight yellow | White | 8.5 | 4.0 |
| | | | | 50 | 24 | do | Yellow | do | 10.0 | 4.0 |
| 3b | 3.3 | 0.9 | 0.025 | (2) | 86 | Solid | Yellow | Very light yellow | 17.1 | 5.3 |
| | | | | 50 | 15 | Hard-solid | do | do | 29.5 | 8.0 |
| 4a | | | 0.004 | (2) | 89 | Slushy | White | White | 2.9 | 4.0 |
| | | | | 50 | 24 | do | do | do | 4.0 | 1.7 |
| 4b | 3.3 | 0.9 | 0.004 | (2) | 84 | Soft-solid | White | White | 8.6 | 5.3 |
| | | | | 50 | 15 | do | do | do | 12.3 | 6.3 |
| 5 | 16.5 | 4.5 | 0.033 | (2) | 69 | Solid | Light yellow | White | 14.1 | 7.8 |
| | | | | 50 | 22 | Hard-solid | do | do | 24.8 | 5.3 |
| 6 | 4.2 | | 0.033 | (2) | 85 | Soft-slush | White | White | 5.8 | 4.0 |
| | | | | 50 | 38 | Soft-solid | Slight yellow | do | 11.9 | 4.0 |
| 7 | | 4.2 | 0.033 | (2) | 83 | Soft-slush | Slight yellow | White | 7.3 | 4.0 |
| | | | | 50 | 36 | Soft-solid | Light yellow | do | 17.2 | 4.0 |
| 8 | [3] 4.2 | | 0.033 | (2) | 81 | Soft-slush | Slight yellow | White | 8.5 | 4.7 |
| | | | | 50 | 84 | Solid | Light yellow | do | 19.4 | 4.0 |

[1] Intrinsic viscosity measured at 30° C. in formic acid.
[2] Room temperature.
[3] K$_2$S$_2$O$_5$ used in place of both NaHSO$_3$ and Na$_2$SO$_3$.

Examples 1–4 dramatically show the increase in percent conversion and molecular weight (intrinsic viscosity) when the added mixture of sulfite and bisulfite is employed. Example 5 demonstrates that large amounts of the added mixture also give good results. Examples 6–8, when compared to Example 2, show that the use of the NaHSO$_3$ or Na$_2$SO$_3$ alone, or the use of K$_2$S$_2$O$_5$ alone, gives no improvements over the polymerization carried out without any added sulfite or bisulfite (Example 2a).

The color of the polymers reported in Table I was determined solely by the judgment of the experimenter based on his visual observation. The slight yellowing of the dry dioxide is introduced into the reaction mass thus formed, and then the reaction mass is polymerized.

References Cited
UNITED STATES PATENTS
3,174,951   3/1965   Taber _____ 260—78 P HAROLD D. ANDERSON, Primary Examiner U.S. Cl. X.R.

260—31.2 N